(12) United States Patent
Khadar

(10) Patent No.: US 8,463,098 B2
(45) Date of Patent: Jun. 11, 2013

(54) OPTICAL TRANSCEIVER ASSEMBLY

(75) Inventor: Ahmed Anthony Khadar, Brooklyn Center, MN (US)

(73) Assignee: Calix, Inc., Petaluma, CA (US)

( * ) Notice: Subject to any disclaimer, the term of this patent is extended or adjusted under 35 U.S.C. 154(b) by 343 days.

(21) Appl. No.: 12/860,211

(22) Filed: Aug. 20, 2010

(65) Prior Publication Data

US 2012/0045187 A1 Feb. 23, 2012

(51) Int. Cl.
*G02B 6/00* (2006.01)

(52) U.S. Cl.
USPC .......................................................... 385/134

(58) Field of Classification Search
None
See application file for complete search history.

(56) References Cited

U.S. PATENT DOCUMENTS

| | | | |
|---|---|---|---|
| 5,134,678 A | 7/1992 | Essert | |
| 6,594,433 B2 | 7/2003 | Rosen et al. | |
| 6,682,230 B1 | 1/2004 | Demangone et al. | |
| 6,850,687 B2 | 2/2005 | Lavoie | |
| 6,893,167 B1 | 5/2005 | Brostrom et al. | |
| 7,150,653 B1 * | 12/2006 | Mason | 439/607.18 |
| 7,341,386 B2 | 3/2008 | Wu | |
| 7,507,034 B2 | 3/2009 | Moore et al. | |
| 7,563,035 B2 | 7/2009 | Ice | |
| 7,670,063 B2 | 3/2010 | Ice | |
| 2003/0002823 A1 | 1/2003 | Wu | |
| 2004/0192091 A1 * | 9/2004 | Yunker et al. | 439/171 |
| 2010/0008630 A1 * | 1/2010 | Marrapode et al. | 385/78 |
| 2011/0268397 A1 * | 11/2011 | Meadowcroft et al. | 385/94 |

OTHER PUBLICATIONS

U.S. Appl. No. 12/892,457, filed Sep. 28, 2010, entitled "Cable Restraint".

* cited by examiner

*Primary Examiner* — Tina Wong
(74) *Attorney, Agent, or Firm* — Shumaker & Sieffert, P.A.

(57) ABSTRACT

Techniques are disclosed that allow an optical transceiver module to be secured to a surface. In one example, an optical transceiver assembly includes an optical transceiver module, and a compressible support clip configured to engage the optical transceiver module, the support clip configured to receive at least a portion of a surface defining an aperture in order to at least partially support the optical transceiver module within the aperture.

20 Claims, 7 Drawing Sheets

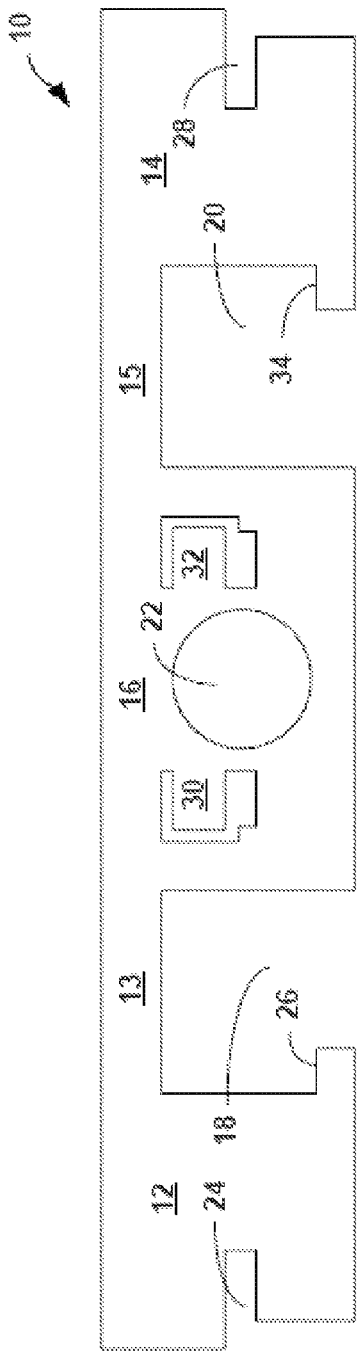
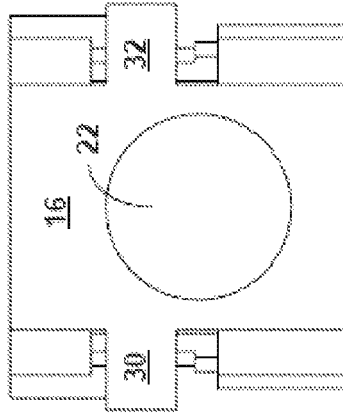
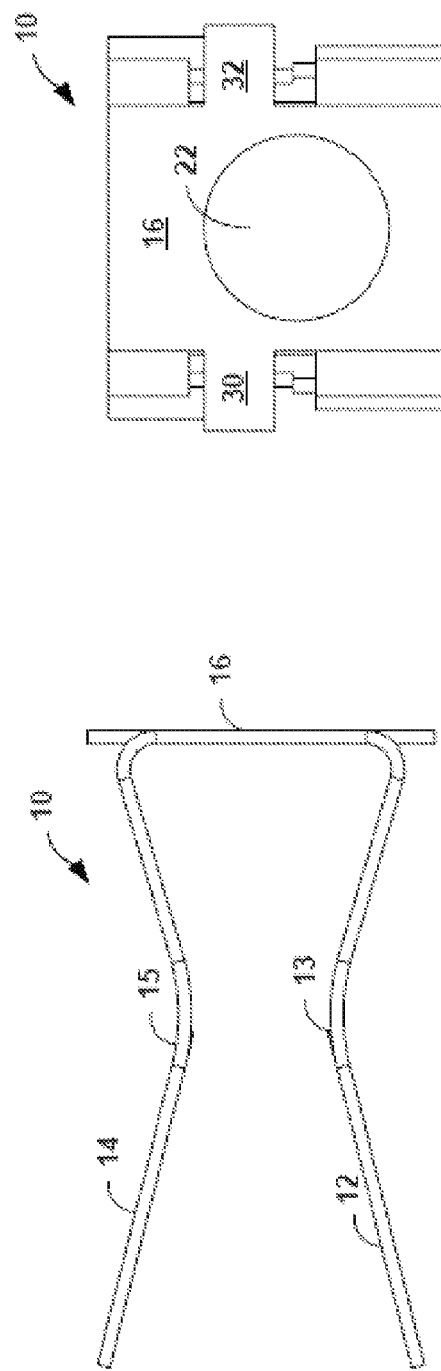

OPTICAL TRANSCEIVER ASSEMBLY

TECHNICAL FIELD

This disclosure relates to optical transceiver modules and, more particularly, to an optical transceiver assembly used within an optical network device.

BACKGROUND

Integrated networks transmit voice, video, and data to subscribers via network signal carriers in the form of coaxial cable or optical fiber. An example of an integrated network is a passive optical network (PON), which can deliver voice, video, and data, often referred to as "triple play services." A PON delivers voice, video and data among multiple network nodes, often referred to as optical network terminations (ONTs), using a common optical fiber link. Passive optical splitters and combiners enable multiple ONTs to share the optical fiber link. Each ONT terminates the optical fiber link for a residential or business subscriber, and is sometimes referred to as a subscriber premises node. An ONT is connected to one or more subscriber devices, such as televisions, set-top boxes, telephones, computers, or network appliances, which ultimately receive the voice, video and other data delivered via the PON.

Generally, a PON includes a PON interface, sometimes referred to as an optical line terminator (OLT), having multiple, independent PON interface modules that serve multiple optical fiber links A PON interface module provides an interface for transmission and reception of data packets over a particular optical fiber link that serves a group of ONTs. A PON is inherently a downstream-multicast medium. Each packet transmitted on an optical fiber link can be received by every ONT served by that link. ONTs identify selected packets or frames on the fiber link based on addressing information included within the packets or frames.

In a fiber to the premises (FTTP) application, each ONT terminates the optical fiber link for a residential or business subscriber, and is sometimes referred to as a subscriber premises node. The OLT is typically located in a telecommunication company central office (CO), while the ONT is typically mounted on or within a residence or business. In one example FTTP application, the triple play services are transmitted over the PON on three wavelengths of light, e.g., 1550 nanometer (nm) for downstream analog video, 1490 nm for downstream digital voice and data, and 1310 nm for upstream digital voice and data.

On the OLT side of the fiber, a 1490 nm transmitter and a 1310 nm receiver are contained in an optical diplexer module. As an example, the optical diplexer module may contain a 1490 nm laser, a 1310 nm positive-intrinsic-negative (PIN) photodiode along with a Trans-Impedance Amplifier (TIA), and Coarse Wavelength Division Multiplexer (CWDM) optics to separate the 1490 and 1310 nm wavelengths of light. The 1550 nm light carrying analog video from a headend cable television (CATV) laser is coupled to the PON via external CWDM optics.

At the ONT, a single optical component called a triplexer separates the three wavelengths received via the optical fiber into three ports. A laser driver controls a 1310 nm laser to transmit upstream data from the ONT onto the optical fiber. A PIN photodiode plus a TIA operate to receive the 1490 nm downstream data from the optical fiber, and an analog photodiode receives the 1550 nm video signal from the optical fiber. CWDM optics also are provided in the ONT to separate the light for the three different ports, i.e., digital transmit, digital receive and analog video. It should be noted that an optical diplexer may be used at the ONT instead of an optical triplexer when RF video is not required.

An optical triplexer module generally includes the triplexer, the laser driver to interface to the laser, the limit amplifier to amplify the output of the low level digital receiver, and the video circuit. More particularly, the video circuit in the triplexer module includes the analog photodiode, an analog photodiode matching network, an automatic gain controller, a radio frequency (RF) amplifier and an RF output connector to a television. The limit amplifier in the receiver transmits digital serial receive data to the ONT media access control (MAC) circuitry, which directs data to provide data and voice applications to a subscriber, e.g., for Ethernet and telephone services. The laser driver receives digital serial transmit data from the ONT MAC for transmission of data via the optical fiber.

SUMMARY

In general, this disclosure describes techniques for securing an optical transceiver module, e.g., an optical diplexer or triplexer, to a surface. In some cases, a support clip is used to mount an optical transceiver module on the surface, e.g., a circuit board, in order to minimize stress to the leads of the transceiver during transport or via an applied shock, for example. The clip may also act as a carrier during transport and assembly. During assembly, the clip may be used for repeatable placement of the optical transceiver module on the circuit board. Additionally, the clip may be used to electrically ground the optical transceiver module to the circuit board and as an attachment point for adding a heat sink device to cool the optical transceiver module.

In one example, the disclosure is directed to a method comprising combining an optical transceiver module and a support clip, applying pressure to the support clip, and inserting the combination into a surface aperture defined by a surface.

In another example, the disclosure is directed to an optical transceiver assembly comprising an optical transceiver module and a compressible support clip configured to engage the optical transceiver module, the support clip configured to receive at least a portion of a surface defining an aperture in order to at least partially support the optical transceiver module within the aperture.

In another example, the disclosure is directed to an optical transceiver assembly comprising an optical transceiver module comprising a plurality of leads, and a compressible support clip configured to engage the optical transceiver module, the support clip configured to receive at least a portion of a surface defining an aperture in order to at least partially support the optical transceiver module within the aperture. The support clip comprises a first side defining a first support clip aperture and a first notch, the first notch configured to receive a first portion of the at least a portion of the surface defining the aperture, a second side substantially opposite the first side, the second side defining a second support clip aperture and a second notch, the second notch configured to receive a second portion of the at least a portion of the surface defining the aperture, and a third side that joins the first side and the second side, the third side defining a third support clip aperture, a third tab, and a fourth tab, the third tab and the fourth tab configured to engage a top side of the surface, wherein each of the second support clip aperture, the third support clip aperture, and the fourth support clip aperture are configured to receive a respective portion of the optical transceiver module, wherein at least a portion of the support clip is constructed of a conductive material, and wherein the plurality of leads are configured to be soldered to either the top of the surface or a bottom of the surface.

The details of one or more aspects of the disclosure are set forth in the accompanying drawings and the description below. Other features, objects, and advantages will be apparent from the description and drawings, and from the claims.

BRIEF DESCRIPTION OF DRAWINGS

FIG. 2 is a flat view of the support clip of FIG. 1.

FIG. 3 is a top view of the support clip of FIG. 1.

FIG. 4 is a front view of the support clip of FIG. 1.

DETAILED DESCRIPTION

This disclosure describes techniques for securing an optical transceiver module, e.g., an optical diplexer or triplexer, to a surface. In accordance with this disclosure, a support clip may be used to mount an optical transceiver module on the surface, e.g., a circuit board, in order to minimize stress to the leads of the transceiver during transport or via an applied shock, for example.

Figure 1:
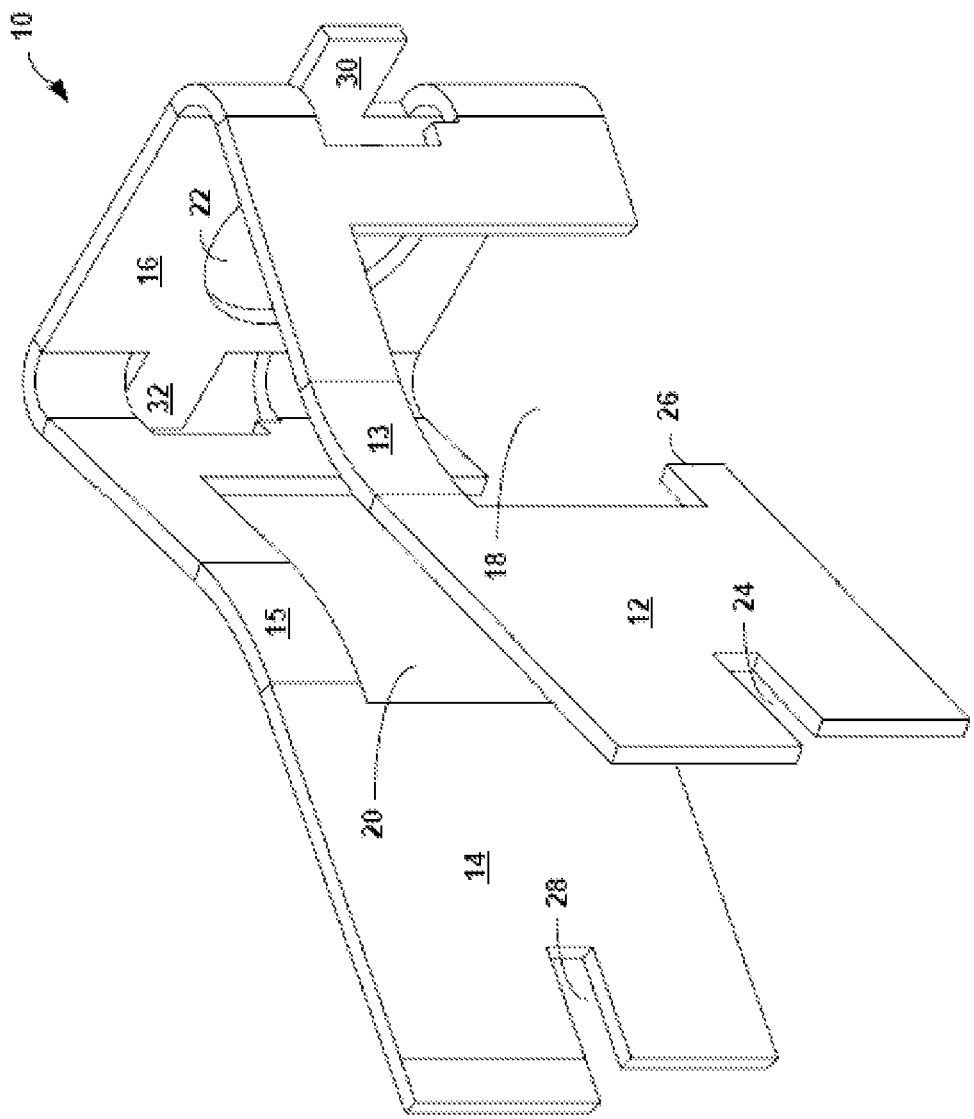
FIG. 1 is a perspective view of a support clip designed in accordance with this disclosure.

FIG. 1 is a perspective view of a support clip designed in accordance with this disclosure. The support clip, generally denoted as support clip 10 in the example of FIG. 1, includes a first side 12, a second side 14, and a third side 16. As seen in FIG. 1, second side 14 is substantially opposite first side 12, and third side 16 joins first side 12 and second side 14. Support clip 10 is configured to engage an optical transceiver module, e.g., an optical diplexer, an optical triplexer, and the like, as shown and described in greater detail below with respect to FIG. 6. In order to engage the optical transceiver module, support clip 10 includes several support clip apertures for receiving portions of the optical transceiver module, as shown and described in more detail below with respect to FIG. 2. In particular, first side 12 defines first support clip aperture 18, second side 14 defines second support clip aperture 20, and third side 16 defines third support clip aperture 22.

In order to secure support clip 10 and the optical transceiver module to a surface, e.g., a printed circuit board (PCB) of an optical network device, support clip 10 may include several notches and tabs. Still referring to FIG. 1, first side 12 defines first notch 24 and first tab 26. Similarly, second side 14 defines second notch 28 and a second tab (obstructed from view in FIG. 1) that may substantially mirror the position of first tab 26. Third side 16 defines third tab 30 and fourth tab 32. Notches 24, 28 of support clip 10 receive portions of a surface to which support clip 10 and an optical transceiver module engaged to support clip 10 will be secured, as shown and described in more detail below. Support clip 10 is shown in FIG. 1 in an uncompressed state. Support clip 10, however, is also configured to have a compressed state. Support clip 10 may enter a compressed state when first side 12 and second side 14 are pinched toward one another, thereby causing first side 12 to flex at first pivot point 13 and second side 14 to flex at second pivot point 15. In the compressed state, support clip 10 is configured such that at least a portion of support clip 10, e.g., one or both of first side 12 and second side 14, applies a positive force to a surface defining a surface aperture in order to support the optical transceiver module within the aperture defined by the surface, i.e., surface aperture. Such a compressed state is shown and described in more detail below.

FIG. 2 is a flat view of the support clip shown in FIG. 1. The flat view of FIG. 2 shows all the features of support clip 10 that are shown and described above with respect to FIG. 1. In addition, FIG. 2 depicts features such as second tab 34 defined by second side 14 that were obstructed in the perspective view of FIG. 1. Tabs 26, 34 may engage a portion of an optical transceiver module so that support clip 10 at least partially captures the transceiver module.

FIG. 3 is a top view of the support clip shown in FIG. 1. Support clip 10 in FIG. 3 is shown in the uncompressed state. The top view of FIG. 3 depicts how first side 12 and second side 14 each flair outwardly from pivot points 13 and 15, respectively, thereby allowing support clip 10 to apply a positive force to a surface when in support clip 10 is in a compressed state.

FIG. 4 is a front view of the support clip shown in FIG. 1. Although FIG. 4 depicts third support clip aperture 22 as being substantially circular, it should be noted that this is only one example implementation of support clip 10. In other example implementations, third side 16 may define third support clip aperture 22 similar to first support clip aperture 18 and second support clip aperture 20 in that third side 16 only defines a portion of aperture 22 (as shown in FIG. 6).

Figure 5:
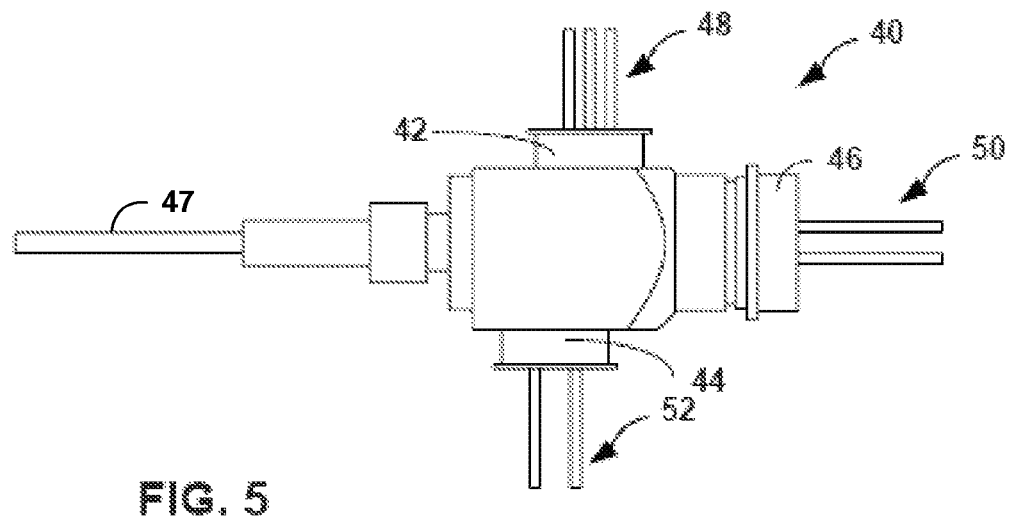
FIG. 5 is a top view of an example optical transceiver module.

FIG. 5 is a top view of an example optical transceiver module. Optical transceiver module 40, e.g., an optical diplexer, an optical triplexer, or the like, includes digital receiver 42, analog receiver 44, and transmitter 46 for receiving and transmitting light pulses via fiber optic cable 47. As seen in FIG. 5, each of digital receiver 42, analog receiver 44, and transmitter 46 comprises a plurality of leads, shown generally in the example of FIG. 5 as leads 48, 50, and 52, respectively. In some example implementations, optical transceiver module 40 and, in particular, leads 48, 50, and 52, are soldered to pads on a printed circuit board that forms a portion of an optical network device. Without using a support clip to secure optical transceiver module 40 to the printed circuit board, leads 48, 50, and 52 of optical transceiver module 40, as well as the solder joints joining optical transceiver module 40 to the printed circuit board, may be subjected to numerous stresses that occur during transport or are caused by applied shocks, as one example.

Using the techniques of this disclosure, support clip 10 of FIG. 1 is engaged to optical transceiver module 40 of FIG. 5, thereby forming an optical transceiver assembly, as shown and described below with respect to FIG. 6. Thus, support clip 10, rather than leads 48, 50, and 52, supports optical transceiver module 40 within aperture 62 of a surface, e.g., a printed circuit board, to which optical transceiver module 40 is affixed. During assembly, the clip may be used for repeatable placement of the optical transceiver module on the circuit board. Additionally, the clip may be used to electrically ground the optical transceiver module to the circuit board and as an attachment point for adding a heat sink device to cool the optical transceiver module.

Figure 6:
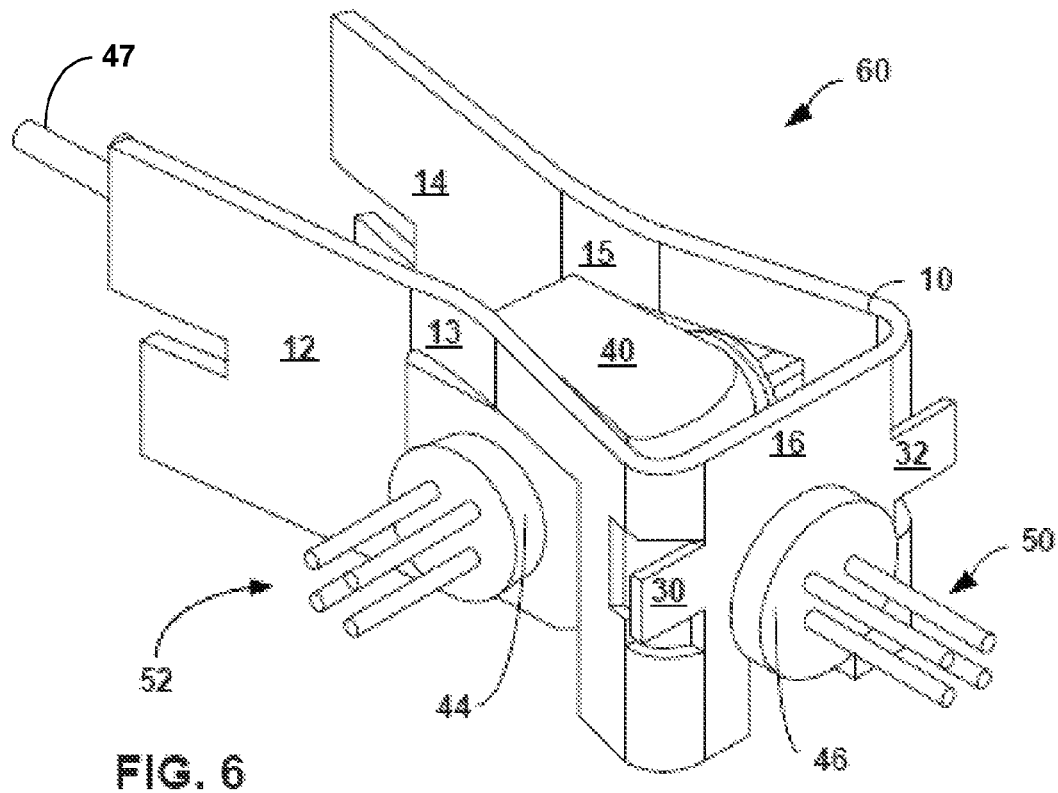
FIG. 6 is a perspective view of an optical transceiver assembly designed in accordance with this disclosure.

FIG. 6 is a perspective view of an optical transceiver assembly 60 designed in accordance with the techniques of this disclosure. FIG. 6 depicts optical transceiver assembly 60 comprising support clip 10 shown in the example of FIG. 1 in combination with optical transceiver module 40 shown in the example of FIG. 5. FIG. 6 shows assembly 60 in an exemplary uncompressed state. First support clip aperture 18 of FIG. 1 (not labeled in FIG. 6 for ease of illustration purposes) receives a first portion of the optical transceiver module, e.g., analog receiver 44, second support clip aperture 20 of FIG. 1 (again, not labeled in FIG. 6 for ease of illustration purposes) receives a second portion of the optical transceiver module, e.g., digital receiver 42, and third support clip aperture 22 of FIG. 1 (also not labeled in FIG. 6 for ease of illustration purposes) receives a third portion of the optical transceiver module, e.g., transmitter 46.

Support clip 10 can be combined with optical transceiver module 40, thereby forming optical transceiver assembly 60, and then assembly 60 may be shipped to an assembler for installation on a printed circuit board of a networking device. In this manner, support clip 10 may act as a carrier for optical transceiver module 40 during transport and assembly. Such use of support clip 10 may prevent damage to optical transceiver module 40 generally or to leads 48, 50, and 52 in particular by providing an alternate handling surface to the optical transceiver module itself.

Optical transceiver module 40 may lack features that would allow support clip 10 to adequately restrain or capture optical transceiver module 40. Thus, in some example implementations, support clip 10 may include additional features, e.g., additional tabs, that may be adjusted, e.g., bent in the case of tabs, so that support clip 10 may adequately restrain or capture optical transceiver module 40 in such a way as to minimize or eliminate relative movement, e.g., in all axes, between support clip 10 and optical transceiver module 40.

As mentioned above, support clip 10 may have a compressed state and an uncompressed state. Hence, in some example implementations, support clip 10 may be constructed of a material with sufficient elastic characteristics to allow support clip to transition between a compressed state and an uncompressed state. For example, support clip 10 may be constructed at least partially from sheet metal in order to allow first side 12 and second side 14 to be compressed towards one another, e.g., by pinching. It should be noted that, in some examples, the material used to construct support clip 10 should be sufficiently resilient as to bias support clip 10 in an outwardly direction when support clip 10 is in a compressed state. This bias allows support clip 10 to apply a positive force to at least a portion of the surface, e.g., printed circuit board, defining the aperture, thereby supporting the assembly within the surface aperture. In other examples, when support clip 10 is constructed of sheet metal, it may be desirable to slightly over-form first and second sides 12, 14 so that support clip 10 applies a positive force to optical transceiver module 40, which may prevent movement between optical transceiver module 40 and support clip 10 during shipping and/or handling of optical transceiver assembly 60. In other words, first pivot point 13 and second pivot point 15 may extend over module 40, even in the uncompressed state, in order to secure module 40 during shipment, for example.

Figure 7:
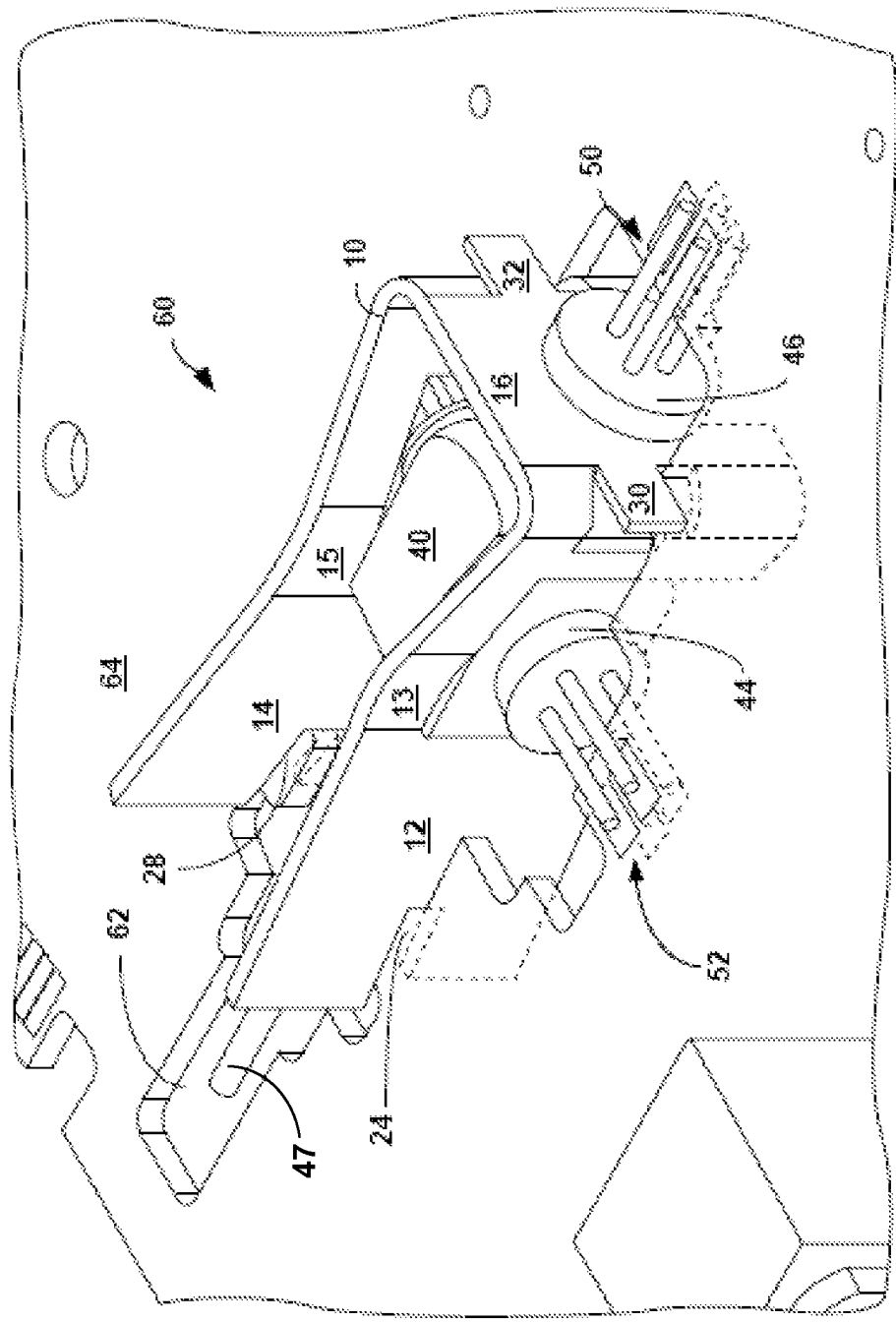
FIG. 7 depicts a perspective top view of the optical transceiver assembly of FIG. 6 installed within a surface aperture.

FIG. 7 depicts a perspective top view of the optical transceiver assembly of FIG. 6 installed within a surface aperture. In FIG. 7, support clip 10 is shown inserted and supported within aperture 62. In some example configurations, support clip 10 is configured such that first side 12 and second side 14 apply a positive force against at least some of the portions of surface 64, e.g., a printed circuit board, that define aperture 62. In other configurations, support clip 10 may be in a relaxed state such that notches 24, 28 and tabs 30, 32, and not a positive force applied by support clip 10, secure and support the support clip within the aperture.

In the example implementation shown in FIG. 7, leads 50, 52, and 48 (obstructed from view in FIG. 7) straddle surface 64. That is, some of leads 48, 50, and 52 are positioned to be engaged, e.g., via soldering, to the top side of surface 64, and some of leads 50, 52, and 48 are positioned to be engaged, e.g., via soldering, to the bottom side of surface 64. By using surface mount techniques as shown in the example of FIG. 7 to affix leads 48, 50, and 52 to surface 64 instead of through-hole techniques, leads 48, 50, and 52 may be shortened, which may reduce electrical noise. In addition, the use of surface mount techniques may eliminate the need to form or bend leads 48, 50, and 52 as may be required by through-hole techniques.

In the configuration depicted in FIG. 7, first notch 24 receives a first portion of surface 64 and second notch 28 receives a second portion of surface 64. Notches 24, 28 allow a portion of support clip 10 to be below surface 64 and another portion to be above surface 64, thereby facilitating placement of leads 48, 50, and 52 for soldering, as described above. In addition, by receiving portions of surface 64, notches 24, 28 facilitate the securing of optical transceiver assembly 60 to surface 64.

As mentioned above, in some example configurations, support clip 10 may include third tab 30 and fourth tab 32. Tabs 30, 32 may provide further support to optical transceiver assembly 60 within aperture 62 by engaging surface 64. In other configurations, one or both of tabs 30, 32 may be soldered to ground pads on surface 64, thereby electrically grounding support clip 10 and optical transceiver module 40. In some configurations, first side 12 and second side 14 may be soldered to additional ground pads (not shown) on surface 64. Electrical performance of optical transceiver module 40 may be improved if module 40 is electrically grounded to a printed circuit board. For such configurations, the material used to construct at least some of support clip 10 should be conductive and solderable. In addition, the material used to construct support clip 10 may be bondable, which would allow support clip 10 to be bonded, e.g., permanently attached, to optical transceiver module 40. Such bonding may be achieved by welding or use of an electrically conductive adhesive.

Although not depicted, in some configurations, support clip 10 may facilitate cooling of optical transceiver module 40. For example, a heat sinking device may be attached to support clip 10 to allow optical transceiver module 40 to more quickly dissipate any generated heat. In such configurations, in may be desirable to include additional tabs, indentations, notches or the like on support clip 10 to provide one or mechanisms to secure the heat sinking device to clip 10.

Figure 8:
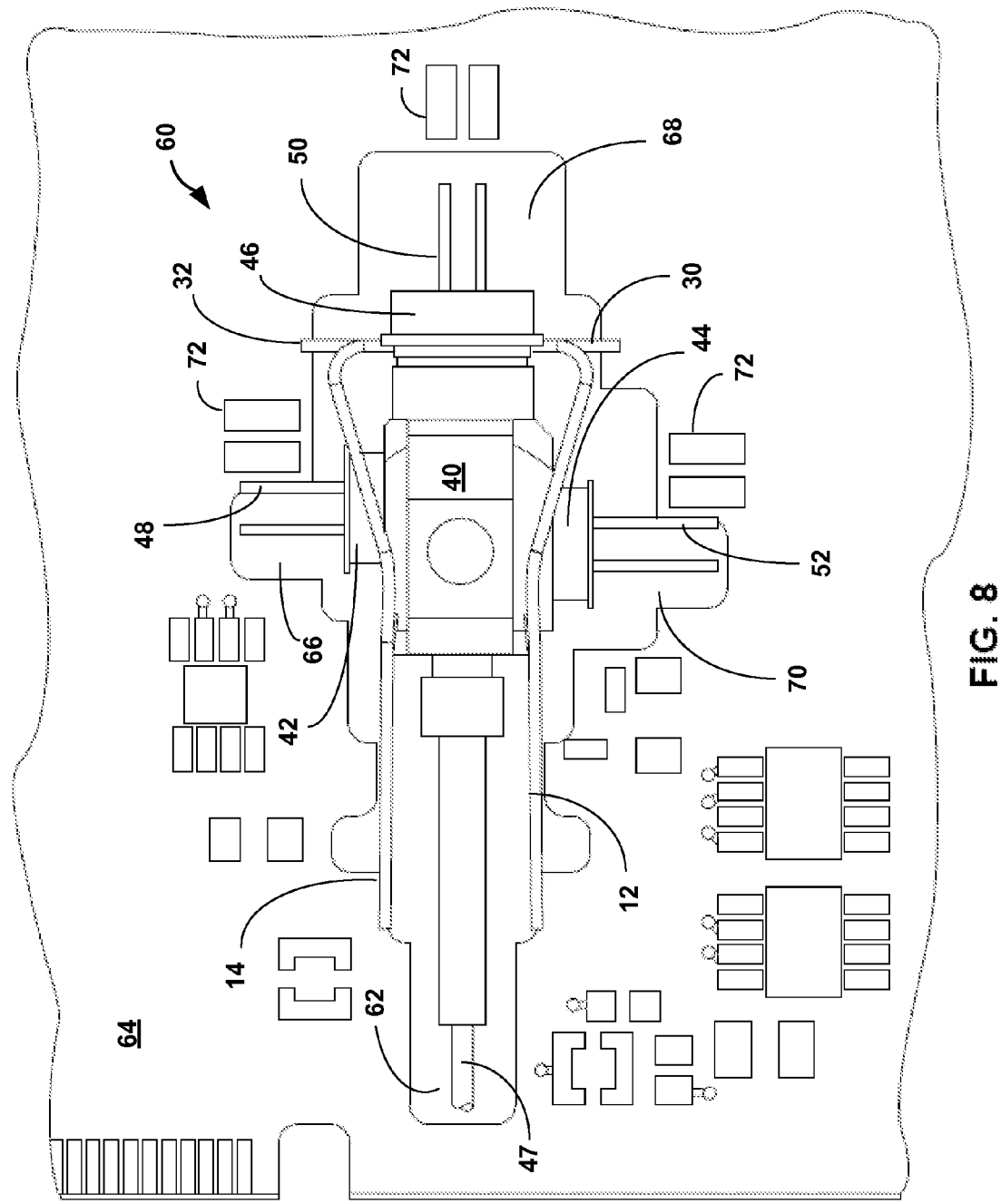
FIG. 8 depicts a top view of the optical transceiver assembly of FIG. 6 during installation within a surface aperture.
Figure 9:
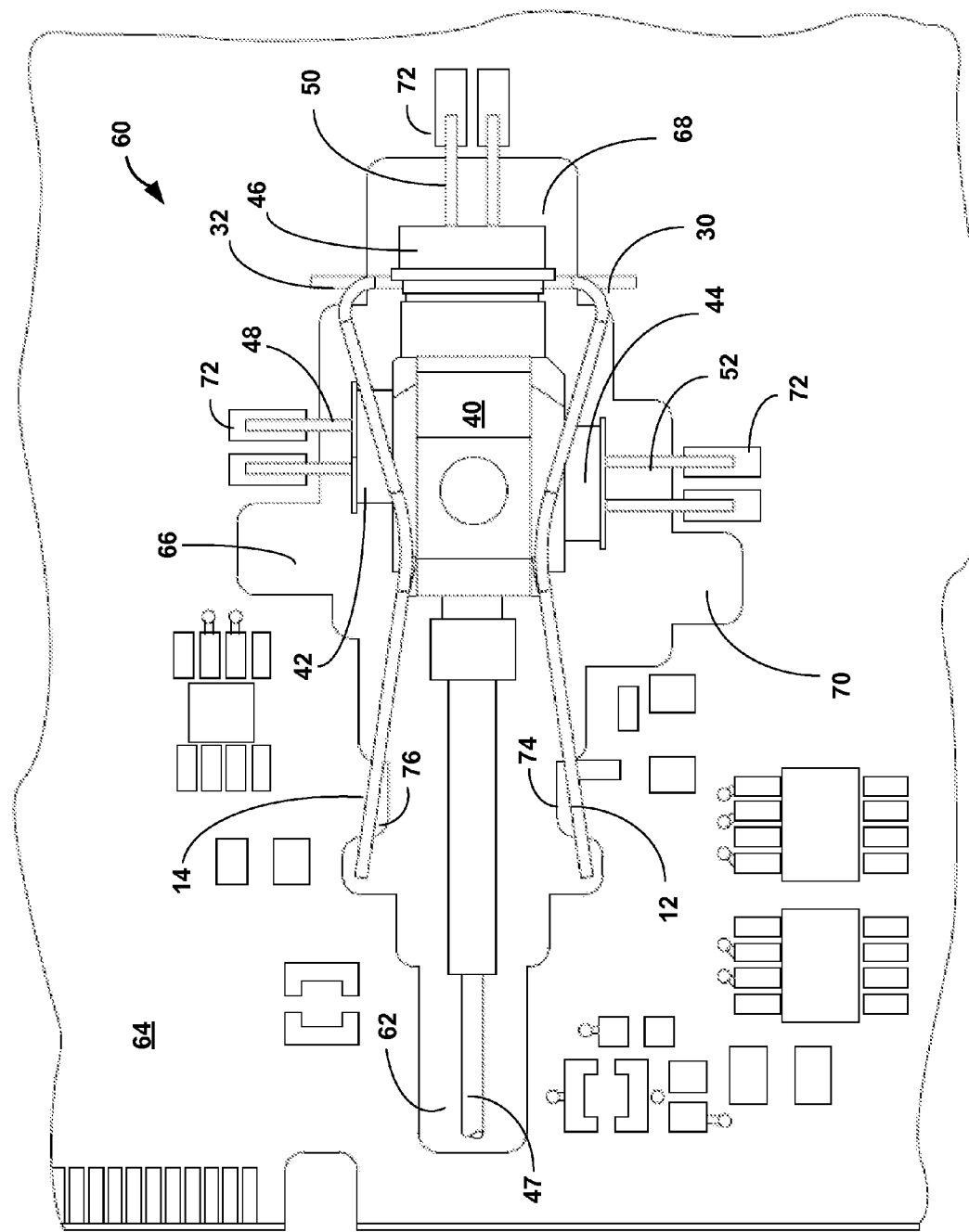
FIG. 9 depicts a top view of the optical transceiver assembly of FIG. 6 installed within a surface aperture.

FIGS. 1-7 generally depict support clip 10 and optical transceiver assembly 60. FIGS. 8 and 9, below, illustrate how optical transceiver assembly 60 is placed within aperture 62 and secured to surface 64.

FIG. 8 depicts a top view of optical transceiver assembly 60 shown in the example of FIG. 6 during installation within a surface aperture 62. FIG. 8 shows assembly 60 in a compressed state such that first side 12 and second side 14 of support clip 10 are compressed towards one another so that optical transceiver assembly 60 may be placed within aperture 62 of surface 64, e.g., a printed circuit board. In order to facilitate placement of optical transceiver assembly 60 within aperture 62 and to prevent damage to any of leads 48, 50, and 52, surface 64 may define aperture 62 with cutout regions 66, 68, and 70. During initial insertion of optical transceiver assembly 60 into aperture 62, cutout regions 66, 68, and 70 receive leads 48, 50, and 52. Then, as shown and described in more detail below with respect to FIG. 9, optical transceiver assembly 60 is slid forward to align features of support clip 10 and optical transceiver module 40 with features of surface 64, e.g., solder pads 72.

FIG. 9 depicts a top view of the optical transceiver assembly 60 of FIG. 6 installed within a surface aperture 62. In particular, the example of FIG. 9 depicts optical transceiver assembly 60 once assembly 60 has been slid forward and secured within aperture 62. Leads 48, 50, and 52 of optical transceiver module 40 are aligned with solder pads 72 on surface 64 so that leads 48, 50, and 52 may be soldered to pads 72. Further, tabs 30, 32 may be aligned with solder pads (not shown) so that support clip 10 may be electrically grounded to the printed circuit board. In addition, notches 24, 28 (not shown) have received portions 74, 76 of surface 64. In this manner, support clip 10 and optical transceiver module 40 are completely constrained on the printed circuit board.

As mentioned above, tabs 26, 34 (not shown in FIG. 9) may engage a portion of optical transceiver module 40 to ensure that the leads of the module straddle the surface. That is, tabs 26, 34 are configured to locate leads 48, 50, and 52 at a particular depth so that some of leads 48, 50, and 52 may soldered to solder pads on the top of surface 64 and some of leads 48, 50, and 52 may soldered to solder pads on the bottom of surface 64.

It should be noted that support clip 10 might be designed for later addition to the printed circuit board after the optical transceiver module has been soldered to the board. In such a case, the support clip may be formed from one or more pieces that can be fastened or soldered to the printed circuit board. In order to relieve stress on the leads of the optical transceiver module, it may be desirable for the support clip to capture the optical transceiver module in such a way as to reduce or eliminate any relative motion between the optical transceiver module and the support clip.

Figure 10:
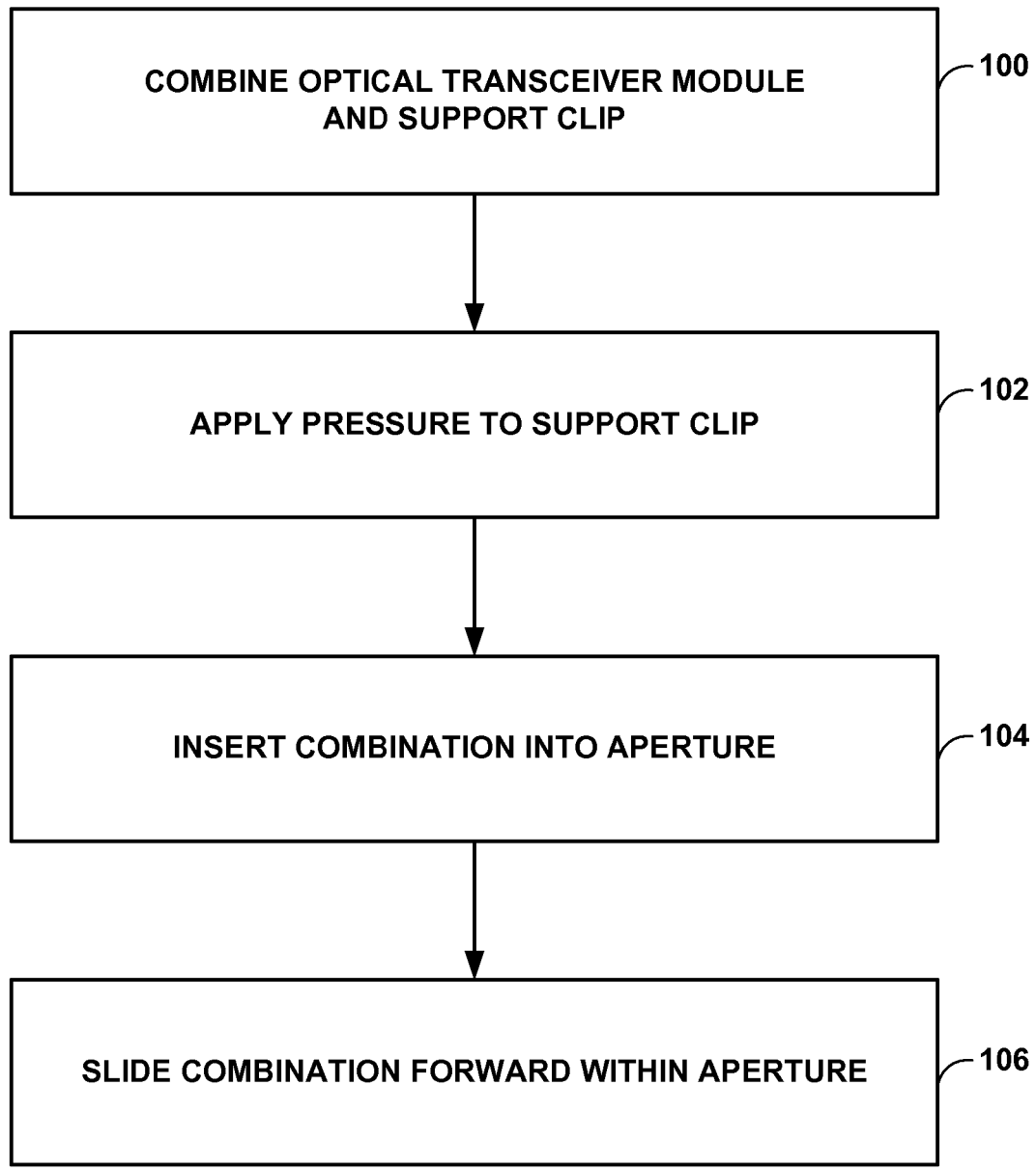
FIG. 10 depicts a flow chart of one example method for installing an optical transceiver module onto a printed circuit board using the techniques of this disclosure.

FIG. 10 depicts a flow chart of one example method for installing an optical transceiver module onto a printed circuit board using the techniques of this disclosure. First, support clip 10 and optical transceiver module 40 are combined (100). For example, leads 50 of optical transceiver module 40 may be fitted through support clip aperture 22, and leads 48, 42 may be fitted through support clip apertures 18, 20, respectively. Pressure is applied to support clip 10 (102) and, in particular, to first and second sides 12, 14 in order to reduce the profile of support clip 10 to facilitate placement of optical transceiver assembly 60 within aperture 62. Optical transceiver assembly 60 is inserted into the aperture of a surface (104), e.g., aperture 62 of a printed circuit board. Finally, optical transceiver assembly 60 is slid forward within aperture 62 until first side 12 and second side 14 "spring out" and notches 24, 28 receive portions 74, 74 of surface 64, thereby securing assembly 60 to the printed circuit board (106). Sliding assembly 60 forward also aligns leads 48, 50, and 52 of optical transceiver module 40 with the solder pads of the printed circuit board. In some instances, if there is a large variation in position between leads 48, 50, and/or 52 and solder pads 72, the leads may be bent slightly to align with the solder pads. In some example configurations, support clip 10 may be sized such that slight adjustments within aperture 62 are allowed after support clip 10 has been installed, thereby facilitating alignment of the leads with the solder pads.

Using the techniques described in this disclosure, a support clip may support an optical transceiver module within an aperture of a printed circuit board, thereby allowing the leads of the optical transceiver module to be shortened, which may reduce electrical noise. In addition, the use of surface mount techniques to electrically connect the leads of the optical transceiver module may eliminate the need to form or bend the leads, as may be required by through-hole techniques. By supporting an optical transceiver module within an aperture of a printed circuit board during assembly, the support clip described throughout this disclosure may reduce the amount of time required to align the leads of the optical transceiver module with the solder pads of the printed circuit board and reduce the opportunities for damaging the optical transceiver module, e.g., the leads of module 40. In addition, supporting optical transceiver module within an aperture of a printed circuit board during assembly may allow the optical transceiver module to be accurately placed on the printed circuit board, thereby facilitating a high volume production environment. The support clip described above may be installed on the optical transceiver module and shipped as an assembly, or the support clip may be shipped separately and then combined with the optical transceiver module prior to assembly on a printed circuit board. Use of the support clip may reduce or eliminate the need for tools during installation of optical transceiver module 40 on a printed circuit board. In this sense, the clip may be used for repeatable placement of the optical transceiver module on the circuit board.

Various examples of the disclosure have been described. These and other examples are within the scope of the following claims.

The invention claimed is:

1. An optical transceiver assembly comprising:
   an optical transceiver module; and
   a compressible support clip configured to engage the optical transceiver module, the support clip configured to receive at least a portion of a surface defining an aperture in order to at least partially support the optical transceiver module within the aperture.

2. The assembly of claim 1, wherein the surface is a printed circuit board.

3. The assembly of claim 2, wherein the printed circuit board forms a part of an optical network component.

4. The assembly of claim 1, wherein the compressible support clip comprises:
   a first side defining a first support clip aperture;
   a second side substantially opposite the first side, the second side defining a second support clip aperture; and
   a third side that joins the first side and the second side, the third side defining a third support clip aperture,
   wherein each of the second support clip aperture, the third support clip aperture, and
   the fourth support clip aperture are configured to receive a respective portion of the optical transceiver module.

5. The assembly of claim 4, wherein at least a portion of the support clip is configured to apply a positive force to at least a portion of the surface defining the aperture.

6. The assembly of claim 5, wherein the at least a portion of the support clip that is configured to apply a positive force to a surface defining a surface aperture comprises the first side and the second side.

7. The assembly of claim 4,
   wherein the first side defines a first notch, the first notch configured to receive a first portion of the at least a portion of the surface defining the aperture,
   wherein the second side defines a second notch, the second notch configured to receive a second portion of the at least a portion of the surface defining the aperture, and wherein the third side defines a third tab and a fourth tab, the third tab and the fourth tab configured to engage a top side of the surface.

8. The assembly of claim 7, wherein the third tab and the fourth tab are configured to be soldered to the surface.

9. The assembly of claim 1, wherein at least a portion of the support clip is constructed of a conductive material.

10. The assembly of claim 1, wherein the optical transceiver module is either a diplexer or a triplexer.

11. A method comprising:
combining an optical transceiver module and a support clip to form a combination;
applying pressure to the support clip; and
inserting the combination into a surface aperture defined by a surface.

12. The method of claim 11, wherein combining an optical transceiver module and a support clip comprises:
inserting a first portion of the optical transceiver module into a first support clip aperture defined by the support clip.

13. The method of claim 11, wherein applying pressure to the support clip comprises:
applying pressure to a first side of the support clip and a second side of the support clip, the second side being substantially opposite the first side.

14. The method of claim 11, wherein the surface defines the entire surface aperture.

15. The method of claim 11, wherein the surface is a printed circuit board.

16. The method of claim 11, wherein inserting the combination into an aperture defined by a surface comprises:
inserting a first portion of the surface defining the surface aperture into a first notch defined by a first side of the support clip; and
inserting a second portion of the surface defining the surface aperture into a second notch defined by a second side of the support clip, the second side being substantially opposite the first side.

17. The method of claim 11, further comprising:
soldering a portion of the support clip to the surface.

18. The method of claim 11, wherein the portion is at least one of a first tab and a second tab, wherein the first tab is defined by a first side of the support clip, and wherein the second tab is defined by a second side of the support clip.

19. The method of claim 11, wherein the optical transceiver module comprises a plurality of leads, the method further comprising:
soldering at least some of the plurality of leads to the surface.

20. An optical transceiver assembly comprising:
an optical transceiver module comprising a plurality of leads; and
a compressible support clip configured to engage the optical transceiver module, the support clip configured to receive at least a portion of a surface defining an aperture in order to at least partially support the optical transceiver module within the aperture, wherein the support clip comprises:
a first side defining a first support clip aperture and a first notch, the first notch configured to receive a first portion of the at least a portion of the surface defining the aperture;
a second side substantially opposite the first side, the second side defining a second support clip aperture and a second notch, the second notch configured to receive a second portion of the at least a portion of the surface defining the aperture;
and
a third side that joins the first side and the second side, the third side defining a third support clip aperture, a third tab, and a fourth tab, the third tab and the fourth tab configured to engage a top side of the surface,
wherein each of the second support clip aperture, the third support clip aperture, and the fourth support clip aperture are configured to receive a respective portion of the optical transceiver module,
wherein at least a portion of the support clip is constructed of a conductive material, and
wherein the plurality of leads are configured to be soldered to either the top of the surface or a bottom of the surface.

* * * * *